United States Patent [19]

Mitsuoka et al.

[11] Patent Number: 4,908,908
[45] Date of Patent: Mar. 20, 1990

[54] BACK DOOR HINGE MOUNTING STRUCTURE

[75] Inventors: Toshihiro Mitsuoka, Zama; Tsutomu Iwasaki, Yokohama; Yoshihisa Kurokawa, both of Yokohama, all of Japan

[73] Assignee: Nissan Motor Co., Ltd., Yokohama, Japan

[21] Appl. No.: 84,222

[22] Filed: Aug. 12, 1987

[30] Foreign Application Priority Data

Aug. 15, 1986 [JP] Japan .......................... 61-125046[U]

[51] Int. Cl.⁴ ............................................. E05D 11/00
[52] U.S. Cl. ........................................ 16/251; 16/254; 16/270; 16/DIG. 40; 296/106; 296/146
[58] Field of Search ................ 16/250, 251, 382, 247, 16/249, 254, 270, DIG. 40; 296/56, 106, 146, 216, 218; 49/382, 398, 399

[56] References Cited

U.S. PATENT DOCUMENTS

| | | | |
|---|---|---|---|
| 2,200,253 | 5/1940 | Atwood | 16/251 |
| 4,433,866 | 2/1984 | Hagiwari | 296/146 |
| 4,664,437 | 5/1987 | Queveau | 296/106 |
| 4,761,852 | 8/1988 | Sauber | 16/251 |

FOREIGN PATENT DOCUMENTS 180315 10/1983 Japan .................................. 296/146

Primary Examiner—Nicholas P. Godici
Assistant Examiner—Edward A. Brown
Attorney, Agent, or Firm—Foley & Lardner, Schwartz, Jeffery, Schwaab, Mack, Blumenthal & Evans

[57] ABSTRACT

A back door hinge mounting structure comprising a pair of bolts connected with to each other at the central portion thereof and threaded at the opposed ends thereof, one end of the opposed ends connected to the roof panel with the other of the opposed ends to the fixed leaf of the back door hinge and a hinge cap for covering the mounting bolts which can be mounted and removed only when the back door is open, so that access to the mounting bolts with the back door closed is avoided.

5 Claims, 4 Drawing Sheets

BACK DOOR HINGE MOUNTING STRUCTURE

BACKGROUND OF THE INVENTION

1. Field of the Invention

The present invention relates to the body structure of an automobile, and, in particular, a back door hinge mounting structure which can be mounted to or removed from the body of the automobile.

2. Description of the Related Art

Referring to FIGS. 6 and 7, a conventional structure for mounting a back door hinge to a vehicle body is summarized. As is commonly known, a back door is provided on the body of an automobile so that it can open and close and is secured to a body panel such as a roof panel 4 through a hinge joint using a structure such as that shown in FIG. 7. Specifically, a stud bolt 3 is secured to a fixed leaf 2a of a hinge 2A which is secured to the upper edge portion of a back door 1A. The stud bolt 3 is inserted into a mounting hole 5 formed in the roof panel 4 or the like and is secured to the hinge 2A by a securing nut 7A, which is tightened by a tool A inserted into the inner portion of a rear roof rail 4A through an access hole 6 of the rear roof rail 4A. The access hole 6 is positioned below the stud bolt 3. A support bracket 9 for mounting a hinge cap 8A formed from an elastic resin is secured to the upper surface of the fixed leaf 2a of the hinge 2A. Therefore, the exposed outer surface portion of the hinge 2A is covered by the hinge cap 8A. This structure is shown, for example, in Japanese Utility Model Publication of Unexamined Application No. SHO-60-37461.

However, with this type of structure, when the back door 1A is mounted or removed, the threaded portion of the stud bolt 3 installed on the top of the heavy back door 1A is inclined to contact the edge of the mounting hole 5 in the roof panel 4 so that when the back door is mounted or removed, the painted surface of the edge of the mounting hole 5 is damaged, leading to the formation of rust. In addition, because the hinge cap 8A is simply inserted into the support bracket 9, it can come off easily, and there are occasions when, whether by chance or misadventure, the hinge cap 8 is lost and the external appearance of the body is marred.

SUMMARY OF THE INVENTION

An object of the present invention is to provide, with due consideration to the drawbacks of such conventional devices, a mounting structure for a back door hinge wherein the painted surfaces of the body panel are not damaged when the back door is being mounted or removed, and wherein the hinge cap cannot be lost by chance or misadventure.

In the present invention this object is accomplished by provision of a back door hinge mounting structure comprising a mounting bolt mounted onto the body of the vehicle to which mounting bolt a back door hinge can be mounted or removed and a hinge cap which covers the mounting bolt and can be mounted or removed by means of a mounting screw on a hinge cap bracket or on the body of the vehicle at a position exposed to the outside of the body when the back door is open.

BRIEF DESCRIPTION OF THE DRAWINGS

These and other objects, features, and advantages of the present invention will become more apparent from the following description of the preferred embodiments, taken in conjunction with the accompanying drawings, in which.

DETAILED DESCRIPTION OF THE PREFERRED EMBODIMENTS

Figure 1:
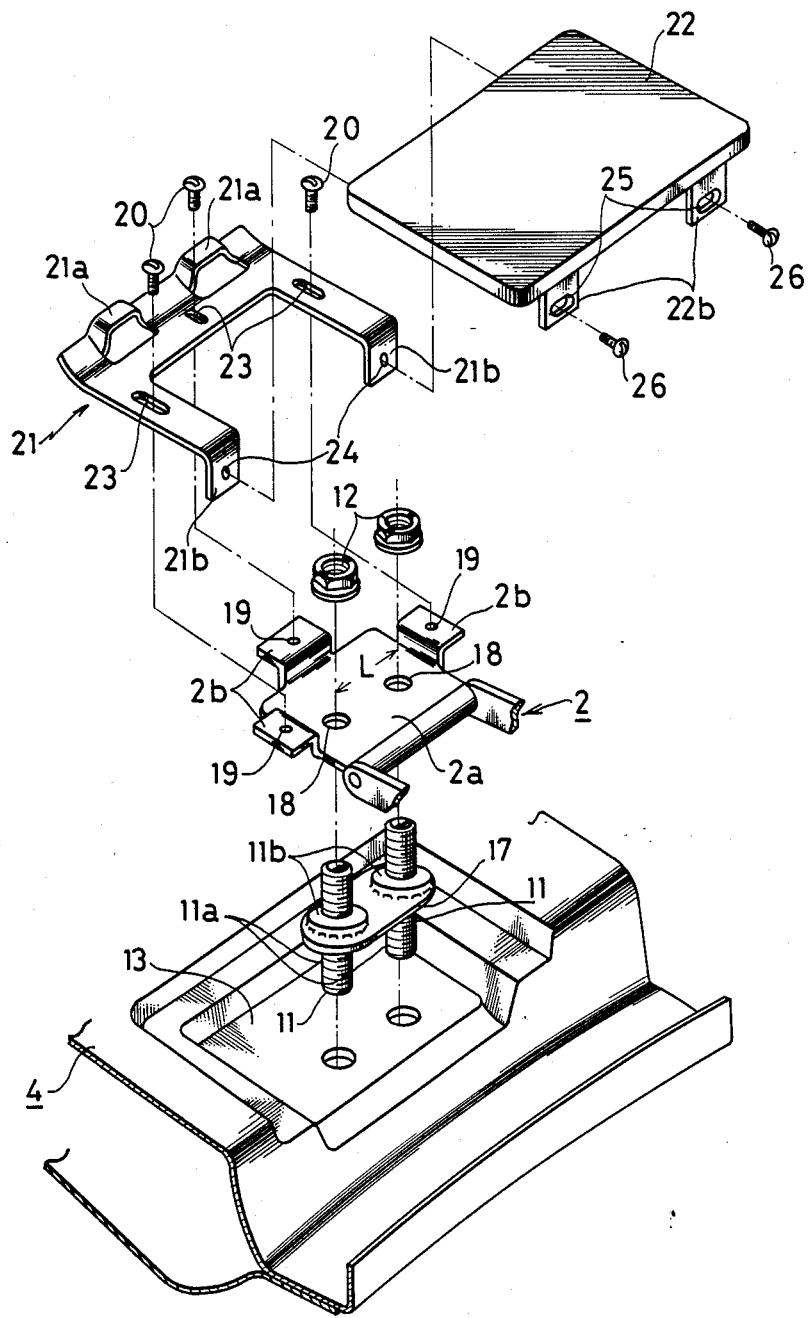
FIG. 1 is an exploded perspective view of a first embodiment of the back door hinge mounting structure of the present invention.
Figure 2:
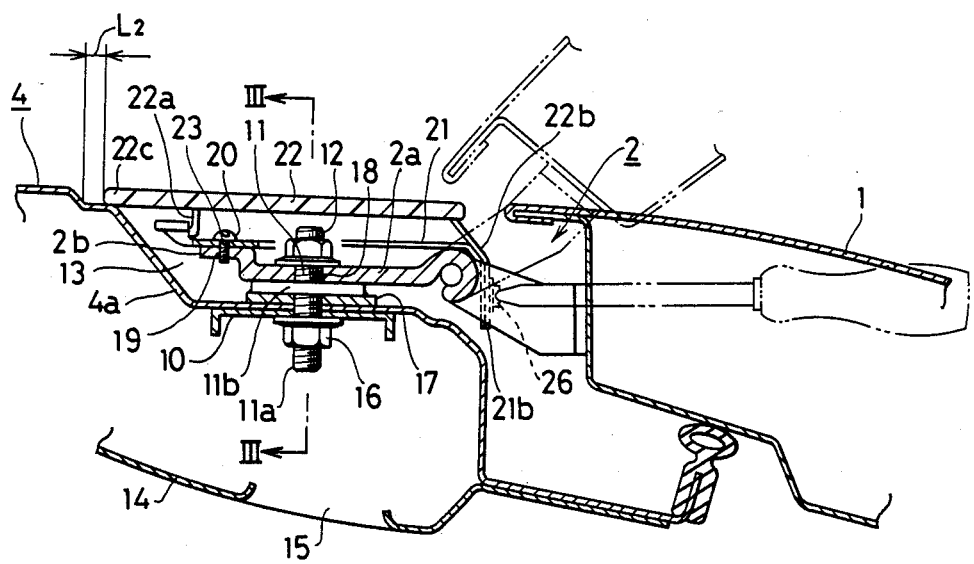
FIG. 2 is a sectional view of the back door hinge mounting structure of FIG. 1.
Figure 3:
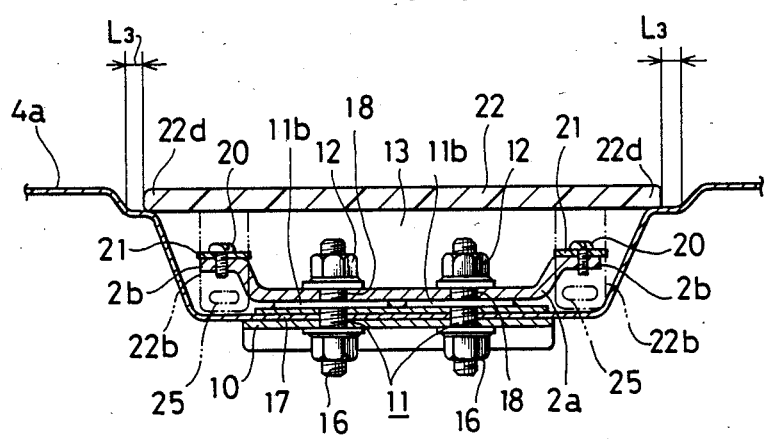
FIG. 3 is a sectional view taken along the line III—III in FIG. 2.
Figure 4:
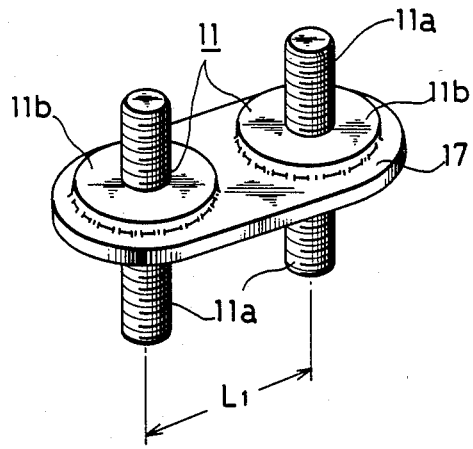
FIG. 4 is an enlarged oblique view of the mounting bolt used with the hinge mounting structure of FIG. 1.

Now FIG. 1 to FIG. 4 show a first embodiment of the present invention. A fixed leaf 2a of a back door hinge 2 secured to the upper edge of a back door 1 is secured so that it can be mounted or removed using a pair of mounting nuts 12 for a pair of mounting bolts 11 positioned on a rear edge portion 4a of a roof panel 4 reinforced by a reinforcing member 10. Prior to assembly of the body of the vehicle, a mounting bolt 11 assembled in the manner shown in FIG. 4 is arranged on a depression 13 formed in the rear edge portion 4a of the roof panel 4. The mounting bolt 11 is secured to the rear edge portion 4a of the roof panel 4 and the reinforcing member 10 by means of a fixed nut 16 inserted from an access hole 15 in a rear roof rail 14. Specifically, each of a pair of mounting bolts 11 comprising a threaded portion 11a on both edges is machined to a shape which provides a collar 11b in the middle portion. Each of the collars 11b is welded to a completely flat retainer plate 17. Conforming to the collar 11b, the retainer plate 17 is at an exact right angle to the threaded portion 11a. The center lines or axes of the pair of integrally formed bolts 11a form parallel lines at an interval equivalent to an interval L1 between through-holes 18 in the fixed leaf 2a which have a diameter almost equivalent to or slightly larger than the outer diameter of the threaded portion 11a. Accordingly, the engaging relationship of the mounting bolt 11 with the through-holes 18 is made stable, and the reproducibility of the fixed relationship of the fixed leaf 2a relative to the mounting bolt 11 is good.

In addition, three mounting sections 2b which extend upward are formed in the fixed leaf 2a of the hinge 2. A plurality of fastener screws 20 are used in the threaded holes 19 of the mounting sections 2b to secure a hinge cap bracket 21. A pair of engaging lugs 21a for engaging the tips of a pair of hooks 22a on the lower surface of a hinge cap 22, which will be later described, are formed on the hinge cap bracket 21 which is fabricated in a C-shape by pressing from a thin metal sheet. Then, a pair of elongated holes 23 are formed in the front-to-rear direction of the vehicle at locations corresponding to the threaded holes 19. In addition, a pair of mounting lugs 21b are formed, bent at a right angle, on the rear edge of the hinge cap bracket 21. For each mounting lug 21ba, mounting screw 26 passes through one of a plurality of elongaged holes 25 and is screwed into a threaded hole 24 in the mounting lug 21b. The elongated holes 25 run in the direction of the width of the vehicle in a mounting leaf 22b provided on the bottom of the rear edge of the hinge cap 22 which covers the top of the fixed leaf 2a. Accordingly, when the fixed leaf 2a of the hinge 2, the hinge cap bracket 21, and the hinge cap 22 are mounted on the body of the vehicle via the mounting bolt 11, as shown in FIG. 2 and FIG. 3, the front edge 22c and a pair of left and right edges 22d of the hinge cap 22 contact the stepped surface of the depression 13. By loosening the fastener screws 20, the hinge cap bracket 21 can be moved along the elongated holes 23 in the front and rear direction of the vehicle with respect to the fixed leaf 2a. Accordingly, the distance L2 between the front edge 22c of the hinge cap 22 and the front edge of the depression 13 can be adjusted. In addition, when the mounting screws 26 are loosened, the hinge cap 22 can be moved along the elongated holes 25 in the direction of the width of the vehicle with respect to the hinge cap bracket 21. Accordingly, the distance L3 between the left and right edges 22d of the hinge cap 22 and the side edge of the depression 13 can be adjusted.

Because the first embodiment of the mounting structure of the back door hinge of the present invention has the above-described structure, the back door 1 can be assembled as shown in FIG. 2 and FIG. 3. Specifically, in the assembly of the vehicle, the hinge leaf 2a of the hinge 2 is mounted to the threaded portions 11a projecting from the retainer plate 17 of the mounting bolt 11 which is secured to the rear edge portion 4a of the body with the nut 16, and the fixed nut 16 is loosened for adjustment while the fixed leaf 2a of the back door leaf 2 is securely tightened to the mounting bolt 11 by means of the mounting nuts 12. After the back door 1 has been adjusted, the mounting bolt 11 may be completely secured on the body of the vehicle by means of the fixed nut 16. Then the location of the hinge cap 22 with respect to the vehicle body can be adjusted by means of the fastener screws 20 which fix the relationship between the fixed leaf 2a of the hinge 2 and the hinge cap bracket 21, and the mounting screws 26 which secure the hinge cap 22 to the hinge cap bracket 21.

In addition, in the case of the embodiment shown in the drawings, to remove the back door 1 from the vehicle, the mounting screws 26 may be loosened with a screw driver when the back door 1 is opened, as shown by the phantom line in FIG. 2. After the mounting screws 26 have been removed, the hinge cap 22 can be removed if the hook 22a of the hinge cap 22 is removed from the engaging lugs 21a of the hinge cap bracket 21 by moving the hinge cap 22 toward the rear of the vehicle. Accordingly, by removing the mounting nuts 12 which are exposed on the body of the vehicle, the fixed leaf 2a of the back door hinge 2 can be pulled from the mounting bolts 11. When the back door 1 is once again mounted on the vehicle, the mounting bolts 11 are inserted into the through-holes 18 of the fixed leaf 2a of the hinge 2, and the fixed leaf 2a may be completely secured with the mounting nuts 12. In the construction mentioned above, because the fixed leaf 2a of the hinge 2 is merely mounted and removed on the mounting bolts 11 which are unrelated to the painted surface of the roof panel 4, there is no concern about damaging the painted surfaces of the vehicle body. In addition, the structure shown in the drawings can be sealed and the fixed leaf 2a of the hinge 2 can be mounted on or removed from the mounting bolts 11 which are secured to the body of the vehicle. Therefore the performance of the seal between the mounting bolts and the body is stable. Rain water and the like can be prevented from running along the mounting bolts from the hinge mounting portion and into the inside of the vehicle.

Figure 5:
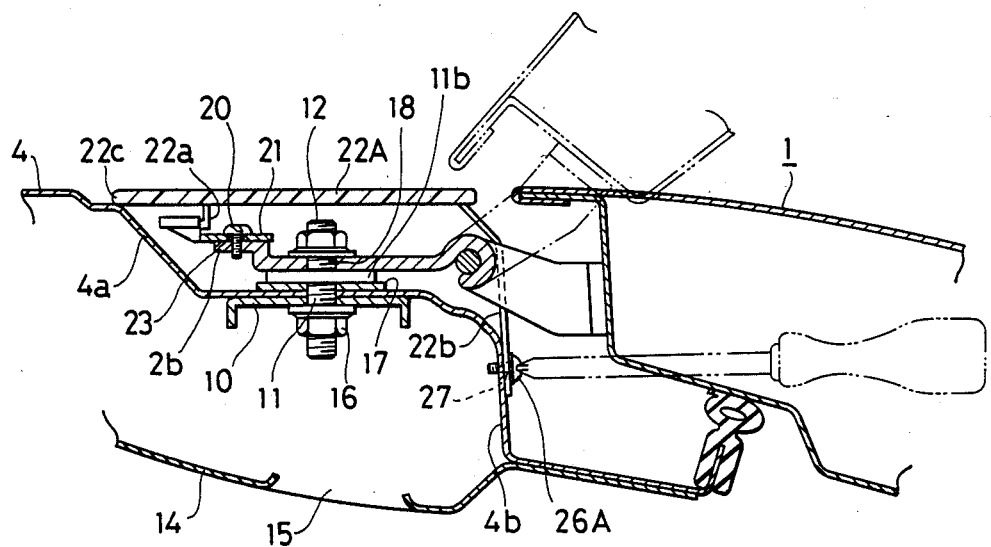
FIG. 5 is a sectional view of a second embodiment of the back door hinge mounting structure of the present invention.
Figure 6:
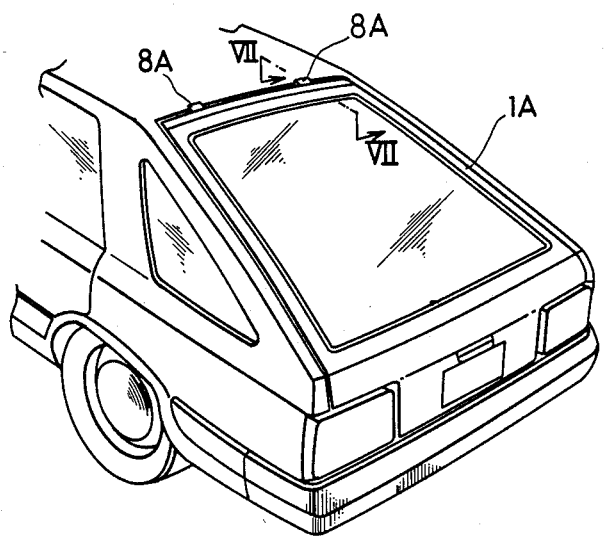
FIG. 6 is a perspective view of the rear portion of an automobile provided with a conventional back door hinge mounting structure.
Figure 7:
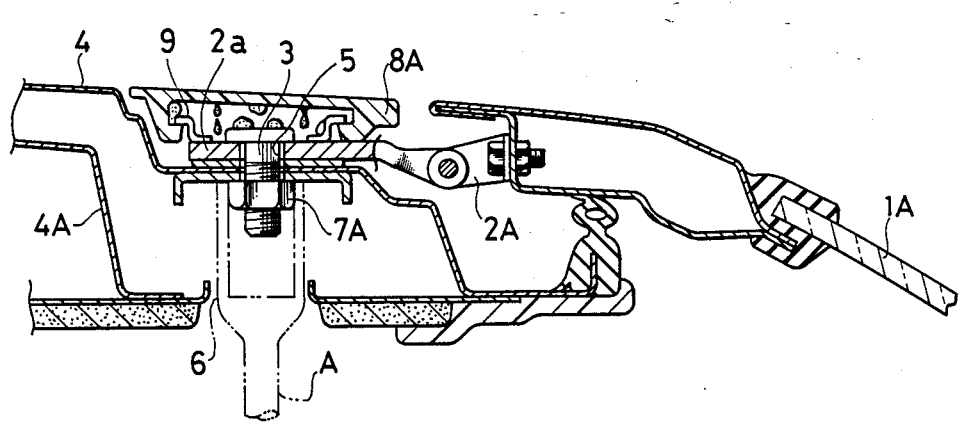
FIG. 7 is a sectional view taken along the line VII—VII in FIG. 6.

FIG. 5 is a sectional view of a second embodiment of the hinge mounting structure of the present invention, equivalent to FIG. 2. The structure parts which are identical to those in FIG. 2 have been assigned the same numbers. The special feature of the second embodiment of the present invention is the construction used to secure a hinge cap 22A to the body of the vehicle. In this embodiment of the present invention, the mounting leaf 22b provided on the lower surface of the back edge of the hinge cap 22A extends downward and is secured by a mounting screw 26A in a threaded hole 27 formed in a rear wall 4b of the roof panel 4. Accordingly, with this type of construction, when the back door 1 is not open as shown by the phantom line in FIG. 5, the head of the mounting screw 26A is not exposed. Accordingly, it is possible to prevent the hinge cap 22A from being removed from the outside while the vehicle is parked.

Further, with the above embodiment, the hinge cap bracket 21 is mounted on the fixed leaf 2a of the hinge 2. However, the hinge cap bracket may be mounted directly on the body of the vehicle by a pair of mounting bolts. Regardless of the mounting and removal status of a back door hinge, the hinge cap bracket and therefore the hinge cap are left on the vehicle even with the back door removed, which is extremely convenient.

As can be clearly understood through the above explanation, by means of the present invention, when the back door is not opened, the hinge cap cannot be removed, so that unauthorized removal of the hinge cap while the vehicle is parked can be prevented. Therefore, because the fixed leaf of the back door hinge is installed on the mounting bolt provided on the body of the vehicle, when the back door hinge is mounted or removed, the painted surface of the roof panel is not damaged.

While preferred embodiments of this invention have been shown and described, it will be appreciated that other embodiments will become apparent to those skilled in the art upon reading this disclosure, and, therefore, the invention is not to be limited by the disclosed embodiments.

What is claimed is:

1. A hinge mounting assembly for removably connecting a vehicle back door to a vehicle body, comprising:
    a door hinge means connected to the vehicle back door for opening and closing the back door;
    a pair of mounting bolt means, each having opposed threaded ends for connecting the door hinge means with the vehicle body; and
    means for preventing the door hinge means from directly contacting the vehicle body, which comprise a flat retainer plate having two sides, wherein each of the opposed threaded ends of the mounting bolt means project from the two sides of the flat retainer plate, one end of the opposed threaded ends being connected to the vehicle body with a first nut and the other end of the opposed threaded end being connected to the door hinge means with a second nut.

2. The hinge mounting assembly of claim 1, wherein a pair of the mounting bolt means are arranged along a central line of the flat retainer plate in a direction orthogonal to the orientation of the pair of the mounting bolts.

3. The hinge mounting assembly of claim 1, wherein the door hinge means comprises a fixed leaf having a pair of first through holes, one end of the opposed threaded ends of each of the mounting bolt means is inserted through one of said first through holes and clamped by the second nut, respectively, and the vehicle body comprises a roof panel having a rear edge portion formed with a pair of second through holes, and the other end of the opposed threaded ends of each of the mounting bolt means is inserted through one of said second through holes and clamped by the first nut, respectively.

4. The hinge mounting assembly of claim 1, which further comprises a hinge cap bracket having a pair of angled mounting lugs each formed with a threaded hole, and a hinge cap which covers the mounting bolt means having a pair of angled mounting leaves each formed with an elongated hole wherein the hinge cap is fixed to the hinge cap bracket with screws screwed into the threaded holes via the elongated holes, wherein the screws are accessible only when the vehicle back door is open.

5. The hinge mounting assembly of claim 1, which further comprises a hinge cap having a pair of angled mounting leaves each formed with an elongated hole for covering the mounting bolt means, the hinge cap being directly fixed to the vehicle body with screws screwed into threaded holes via the elongated holes, whereby the screws are accessible only when the vehicle back door is open.

* * * * *